No. 729,358. PATENTED MAY 26, 1903.
C. A. KLEINER.
CAR BRAKE.
APPLICATION FILED SEPT. 3, 1902.
NO MODEL.

WITNESSES:

INVENTOR
Charles A. Kleiner
BY
ATTORNEYS.

No. 729,358.

Patented May 26, 1903.

UNITED STATES PATENT OFFICE.

CHARLES A. KLEINER, OF NEW YORK, N. Y.

CAR-BRAKE.

SPECIFICATION forming part of Letters Patent No. 729,358, dated May 26, 1903.

Application filed September 3, 1902. Serial No. 121,930. (No model.)

*To all whom it may concern:*

Be it known that I, CHARLES A. KLEINER, a citizen of the United States, and a resident of the city of New York, borough of Manhattan, in the county and State of New York, have invented a new and Improved Car-Brake, of which the following is a full, clear, and exact description.

The purpose of my invention is to provide an auxiliary brake to be used in conjunction with the ordinary brake, which auxiliary brake is adapted to have bearings on the wheels diametrically opposite the ordinary brake and also upon the rails.

Another purpose of the invention is to so construct the brake-shoes of the brakes that the braking-surfaces of the shoes can be quickly and conveniently removed and replaced in the event they should become unduly worn.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
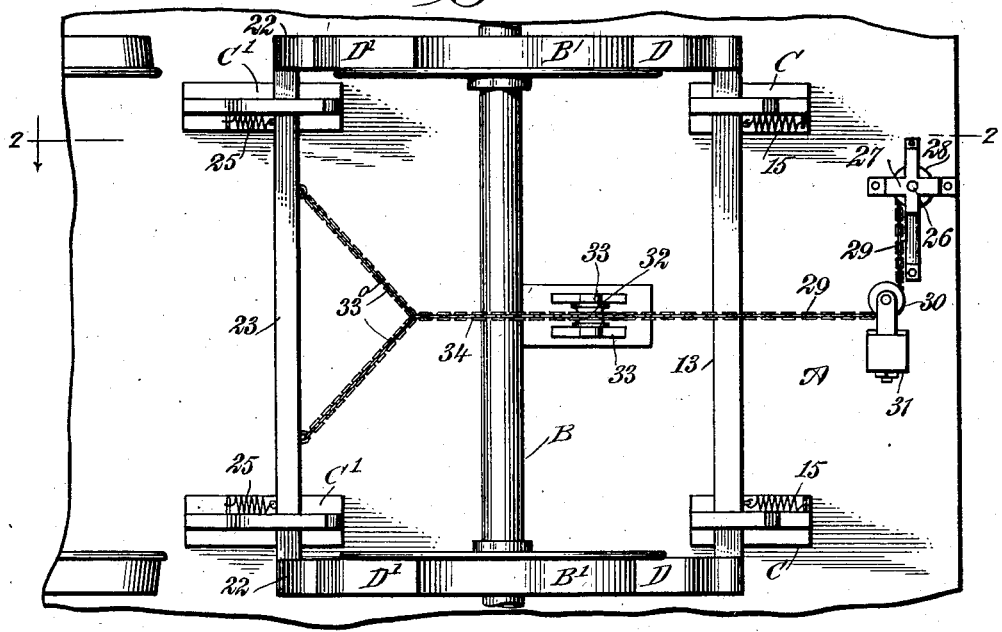
Figure 2:
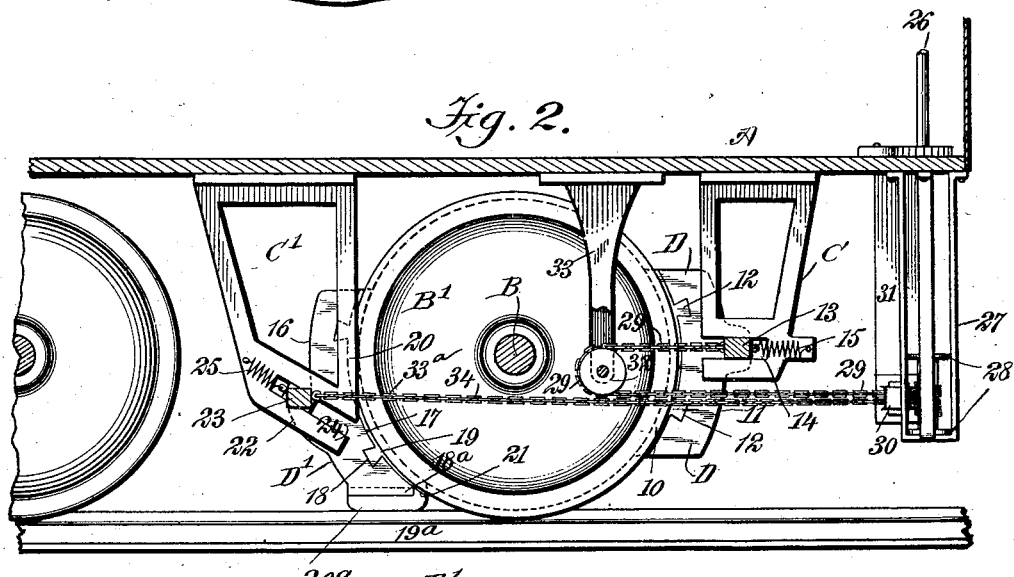
Figure 3:
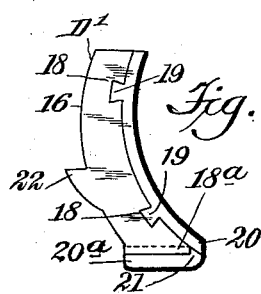

Figure 1 is a bottom plan view of a portion of a car and the wheels of one truck, together with the ordinary and auxiliary brakes applied to said wheels. Fig. 2 is a vertical section taken practically on the line 2 2 of Fig. 1, and Fig. 3 is a side elevation of one of the auxiliary brake-shoes.

A represents the bottom portion of a car; B', the wheels of a truck nearest an end of the car carried by the usual axle B, and C and C' represent hangers which are secured to the bottom portion of the car, extending downward therefrom at opposite sides of the axle B adjacent to the wheels B'.

D represents the ordinarily-located brake-shoes adapted for engagement with the outer tread portions of the car-wheels; but the brake-shoes D differ from the ordinary brake-shoes in that they each consist of a body 11, having a concaved surface facing the wheels, and a bearing-surface 10, conforming to the concaved surface of the body and provided with dovetail lugs 12, which enter correspondingly-shaped recesses in the body, enabling the braking-sections 10 of the shoes D to be readily removed from the body and replaced by others should they become unduly worn. The brake-shoes D are connected by a brake-bar 13, and this brake-bar has sliding movement in horizontal stays 14 at the bottom portion of the hangers C, and springs 15 are attached to the brake-bar 13 and to the hangers, acting to normally hold the brake-shoes D from engagement with the wheels B'.

Opposite the inner tread-surface of each wheel B' an auxiliary brake-shoe D' is located, and each auxiliary brake-shoe D' is adapted not only for braking engagement with a wheel, but likewise for simultaneous braking engagement with the tread-surface of a rail. Each auxiliary brake-shoe D' consists of a body 16, having its outer surface 17 concaved, and in its outer concaved surface which faces a wheel dovetailed recesses 18 are produced, which receive dovetail projections 19 from a brake-surface 20, adapted for direct engagement with the tread of a wheel; and at the bottom portion of each auxiliary brake-shoe D', which bottom portion is flat or horizontal, a longitudinal dovetailed recess $18^a$ is made, adapted to receive a dovetail projection from a bottom bearing-surface $20^a$, which bearing section $20^a$ at its outer or forward portion is provided with an upwardly-extending section 21, fitted to meet the back of the concaved braking-section 20. Under this construction it is obvious that both of the braking-surfaces of the auxiliary shoe D' can be removed and quickly replaced, thus economizing in the wear of the rolling-stock.

At the rear or inner edge of each auxiliary brake-shoe D' an upwardly and outwardly extending horn 22 is formed, and on these horns of the auxiliary brake-shoes a brake-bar 23 rests and is secured, the said brake-bar having sliding movement in slots 24, produced in the hangers C', which slots extend downward and outward, as is shown in Fig. 2, so that when the brake-bar 23 is at the upper portion of the slots 24 the auxiliary brake-shoes D' will be out of engagement with the wheels B' and with the track; but when the brake-bars 23 are drawn down the inclined slots 24 the auxiliary brake-shoes D' are brought into action, bearing against the wheel and simultaneously bearing against the tread of the track. The auxiliary brake-shoes D' are normally held out of braking action by a spring 25, attached to the brake-bar 23 and to the hangers C'. Both sets of brakes are simultaneously operated through the medium of a single brake-shaft 26, located at an end portion of the car and provided with the usual ratchet and pawl.

The brake-shaft 26 extends down and is journaled at the bottom portion of a cage 27, and at the lower portion of the brake-shaft 26 flanges 28 are formed. Between these flanges 28 an end of a main operating-chain 29 is secured to the brake-shaft 26 to be wound around the same. This chain extends from the said brake-shaft in direction of one side of the car to about a central point between its sides, and is then passed over a pulley 30, supported at the lower end of a hanger 31, secured to the bottom portion of the car. The main brake-chain 29 is then carried in direction of the axle B, and adjacent to said axle is passed upward over a pulley 32, journaled between hangers 33, extending down from the central portion of the car, as is shown in Figs. 1 and 2, and then the said main brake-chain 29 is carried to an engagement with the central portion of the brake-beam 13. This main chain acts directly on the main brake-beam 13 to apply the main brake-shoes D. The auxiliary brake-shoes D' are simultaneously applied, however, by connecting chains 33ª to the brake-bar 23 at each side of its center and connecting these chains with a single chain 34, which chain 34 is carried outward and connected with the main chain 29 at a point between the central guide-pulley 32 and the outer end of the car, and the said chain 34 from the auxiliary brake is then continued to the brake-shaft 26 over the pulley 30 or an auxiliary pulley to an attachment to the drum on the brake-shaft, as is shown in Fig. 2. The continuation of the chain 34 insures the brake working should the chain 29 be damaged, since there is a double connection with the brake-shaft.

Having thus described my invention, I claim as new and desire to secure by Letters Patent—

1. In a car-brake, a shoe having a concaved longitudinal side braking-section detachably connected to the body-section and adapted for engagement with a car-wheel, and a bottom braking-section adapted for engagement with a rail, which bottom braking-section meets and fits with tight and uninterrupted connection with the side braking-section, one section thereby bracing the other and constituting a lock, one for the other, in direction of the thrust, the bottom braking-section being likewise removably attached to the body portion of the shoe, the two braking-sections of the shoe constituting a continuous wheel and surface brake, as shown.

2. An auxiliary brake-shoe adapted for engagement with a wheel and simultaneously with a rail, the said brake-shoe comprising a body having a concaved surface provided with dovetail recesses therein, adapted to face a wheel, a braking-section adapted for engagement with a wheel, provided with dovetail projections adapted to enter the dovetail recesses in the body, a horn projected from the longitudinal edge of the shoe opposed to its braking edge, the said shoe being likewise provided with a straight bottom surface having a dovetail recess therein, and a straight braking-section for engagement with a rail, having a dovetailed projection therefrom to enter the dovetail recess in the bottom of the body of said shoe, the two braking-sections being brought together at the working face of the shoe, one having bearing on the other as described.

In testimony whereof I have signed my name to this specification in the presence of two subscribing witnesses.

CHARLES A. KLEINER.

Witnesses:
 FRANK MCGILL,
 WILLIAM BUSE.